US006863916B2

(12) United States Patent
Henriksen et al.

(10) Patent No.: US 6,863,916 B2
(45) Date of Patent: Mar. 8, 2005

(54) APPARATUS AND METHODS FOR MAKING FROZEN FOOD PRODUCTS

(75) Inventors: Wade W. Henriksen, Las Vegas, NV (US); Craig A. Nielsen, Draper, UT (US)

(73) Assignee: Zippy Freeze, Las Vegas, NV (US)

( * ) Notice: Subject to any disclaimer, the term of this patent is extended or adjusted under 35 U.S.C. 154(b) by 363 days.

(21) Appl. No.: 10/039,665

(22) Filed: Jan. 4, 2002

(65) Prior Publication Data

US 2003/0129289 A1 Jul. 10, 2003

(51) Int. Cl.[7] .............................. A23L 3/36; A23G 9/12
(52) U.S. Cl. .......................... 426/524; 62/68; 62/342; 62/354; 62/544; 99/455; 366/149; 366/204; 426/519
(58) Field of Search ................................ 426/524, 519; 62/342, 354, 544, 68; 99/455, 460; 366/149, 204

(56) References Cited

U.S. PATENT DOCUMENTS

| | | | |
|---|---|---|---|
| 1,956,322 A | 4/1934 | Grant | 259/113 |
| 2,416,326 A | 2/1947 | Knibb | 62/114 |
| 2,702,992 A | 3/1955 | Mooser | 62/114 |
| 3,000,194 A | 9/1961 | Carpigiani | 62/342 |
| 3,742,724 A | 7/1973 | Carpigiani | 62/331 |
| 4,793,151 A | 12/1988 | Masel et al. | 62/306 |
| 5,016,446 A * | 5/1991 | Fiedler | 62/342 |
| 5,030,465 A * | 7/1991 | Curry et al. | 426/524 |
| 5,706,720 A | 1/1998 | Goch et al. | 99/455 |

* cited by examiner

*Primary Examiner*—George C. Yeung
(74) *Attorney, Agent, or Firm*—Kirton & McConkie; Berne S. Broadbent

(57) ABSTRACT

An apparatus for making frozen food products having a horizontal mixing spindle with a continuous, closed-loop, recessed, crisscrossed track around its outer lengthwise surface. A paddle wheel encircles the spindle and has a plug or guide skate that extends into the crisscrossed track and guides the paddle wheel back and forth along the length of the spindle as well as around the circumference of the spindle. A horizontal, cylindrical, cooling canister encloses the spindle and paddle wheel and is coupled to a refrigeration unit for keeping the canister and its contents cold. One end of the canister is provided with a push-type dispensing block for dispensing the frozen food product.

31 Claims, 7 Drawing Sheets

APPARATUS AND METHODS FOR MAKING FROZEN FOOD PRODUCTS

BACKGROUND

1. Field of the Invention

The present invention relates generally to methods and apparatus for making frozen desserts and similarly frozen food products. More particularly, the present invention relates to an apparatus and method that can be used to make and dispense both ice cream and iced slush drinks.

2. Background

Several types of ice cream making devices are known in the art. It has long been known that, in order to prevent the formation of large ice crystals, it is necessary to stir the ice cream mix while freezing it. In the earliest forms of domestic ice cream makers, an outer container had within it a rotatable inner container. The space between the two containers was filled with a mixture of ice and salt, and ice cream mix was placed in the inner container. The inner container was then rotated, the ice cream mix being stirred by means of a fixed mixing blade. Alternatively, the mixing blade was instead rotated.

In many modern ice cream making devices, the rotation causing the mixing motion is carried out by means of an electric motor. After the electric motor is switched on, the mixing blade begins to turn, thereby mixing the ice cream mixture. Any ice cream forming on the cold container is scraped off and mixed back into the ice cream mixture. This mixing continues until ice cream of the desired temperature and consistency remains.

Some ice cream making devices, instead of using a mixture of ice and salt to keep the ice cream container cold and thereby freeze the ice cream mix, use an electric refrigerating apparatus. Some devices are designed to include their own portable refrigerating apparatus attached to the ice cream containers; other devices are designed to simply be placed inside the freezer compartment of a typical domestic refrigerator.

SUMMARY AND OBJECTS OF THE INVENTION

The present invention can generally be characterized as an efficient machine with a substantially horizontal, elongate spindle and a paddle wheel that travels along the length of the spindle. A canister encloses the spindle, and the spindle is coupled to a driving device that spins the spindle around its lengthwise axis.

In the preferred embodiments, the canister has a cylindrical, substantially horizontal configuration. Also, a refrigeration unit, coupled to the canister, maintains the canister at a temperature cold enough to cause a frozen food mixture within it to freeze. Some embodiments of the present invention include a removable dispensing block that dispenses the ice cream or other frozen food inside the canister with a handled shaft that is pulled upward and then pushed downward.

Accordingly, it is an object of some embodiments of the present invention to provide a horizontal frozen food mixing and dispensing machine having a spindle encircled by a paddle wheel that travels along the length of the spindle through a recessed, crisscrossed track.

It is another object of some embodiments of the present invention to provide a unique method of making ice cream, slushes and other frozen food products in which the ingredients are simultaneously mixed, stirred, and pushed via a horizontal mixing spindle and a paddle wheel that travels back and forth along a crisscrossed track on the mixing spindle.

It is yet another object of some embodiments of the present invention to provide an efficient frozen food making and dispensing machine suitable for domestic-use that has a horizontal mixing spindle which is enclosed by a horizontal cooling canister.

Another object of some embodiments of the present invention is to provide a frozen food making and dispensing machine with a horizontal spindle that can make traditional ice cream as well as slushes, granita, and other types of frozen food products.

Yet another object of some embodiments of the present invention is to provide a frozen food making method that simultaneously mixes, scrapes, and pushes the food product within a horizontal cooling cylinder containing a spindle with a recessed, crisscrossed track.

These and other objects and features of the present invention will become more fully apparent from the following description, drawings, and the appended claims. Other objects will likewise become apparent from the practice of the invention as set forth hereafter.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE PREFERRED EMBODIMENTS

The following detailed description, in conjunction with the accompanying drawings (hereby expressly incorporated as part of this detailed description), sets forth specific numbers, materials, and configurations in order to provide a thorough understanding of the present invention. The following detailed description, in conjunction with the drawings, will enable one skilled in the relevant art to make and use the present invention.

The purpose of this detailed description being to describe the invention so as to enable one skilled in the art to make and use the present invention, the following description sets forth various specific examples, also referred to as "embodiments," of the present invention. While the invention is described in conjunction with specific embodiments, it will be understood, because the embodiments are set forth for explanatory purposes only, that this description is not intended to limit the invention to these particular embodiments. Indeed, it is emphasized that the present invention can be embodied or performed in a variety of ways. The drawings and detailed description are merely representative of particular embodiments of the present invention.

Reference will now be made in detail to several embodiments of the invention. The various embodiments will be described in conjunction with the accompanying drawings wherein like elements are designated by like alphanumeric characters throughout.

Figure 1:
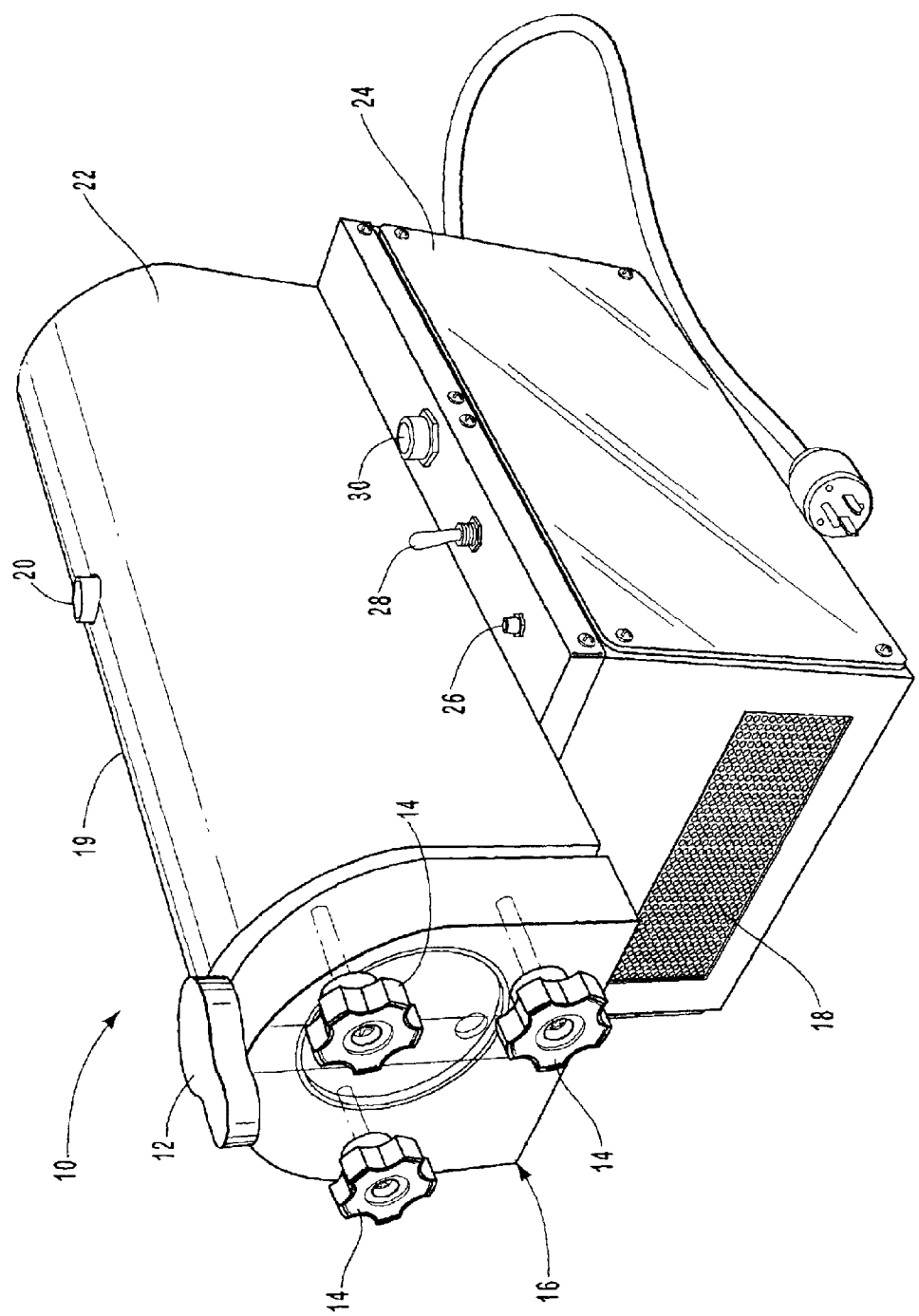
FIG. 1 is a front perspective view of one embodiment of the present invention.

With reference now to the accompanying drawings, FIG. 1 presents a front perspective view of one embodiment of the frozen food product making device 10 of the present invention. The device 10 has a cooling canister 22 for holding ice cream or other frozen food products. For the sake of simplicity, the term "ice cream," for purposes of this detailed description, as well as for purposes of the appended claims is being used as a shorthand description and designation for any frozen food product, including ice cream, ice milk, slush, granita, frozen yogurt, milk shakes, frozen custard, sherbet, sorbet, or other similar frozen food products.

Cooling canister 22 rests in a substantially horizontal position and is made of material suitable for freezing ice cream ingredients that are in direct contact with the inside walls of canister 22. In the preferred embodiments, the cooling canister 22 is made of metal. Also, as described further below, the interior shape of the cooling canister 22 is preferably substantially cylindrical. Here, the cooling canister 22 is shown as having a housing with a rounded top portion 19, making the canister's exterior shape substantially cylindrical.

Cooling canister 22 has a dispensing block 16 removably coupled, via retaining knobs 14, to the front of the ice cream maker 10. Dispensing block 16, here shown as made of a transparent plastic material, has a handle 12 by which a person can dispense the ice cream or other food product when the user pulls up and then pushes down on the handle 12.

Figure 8:
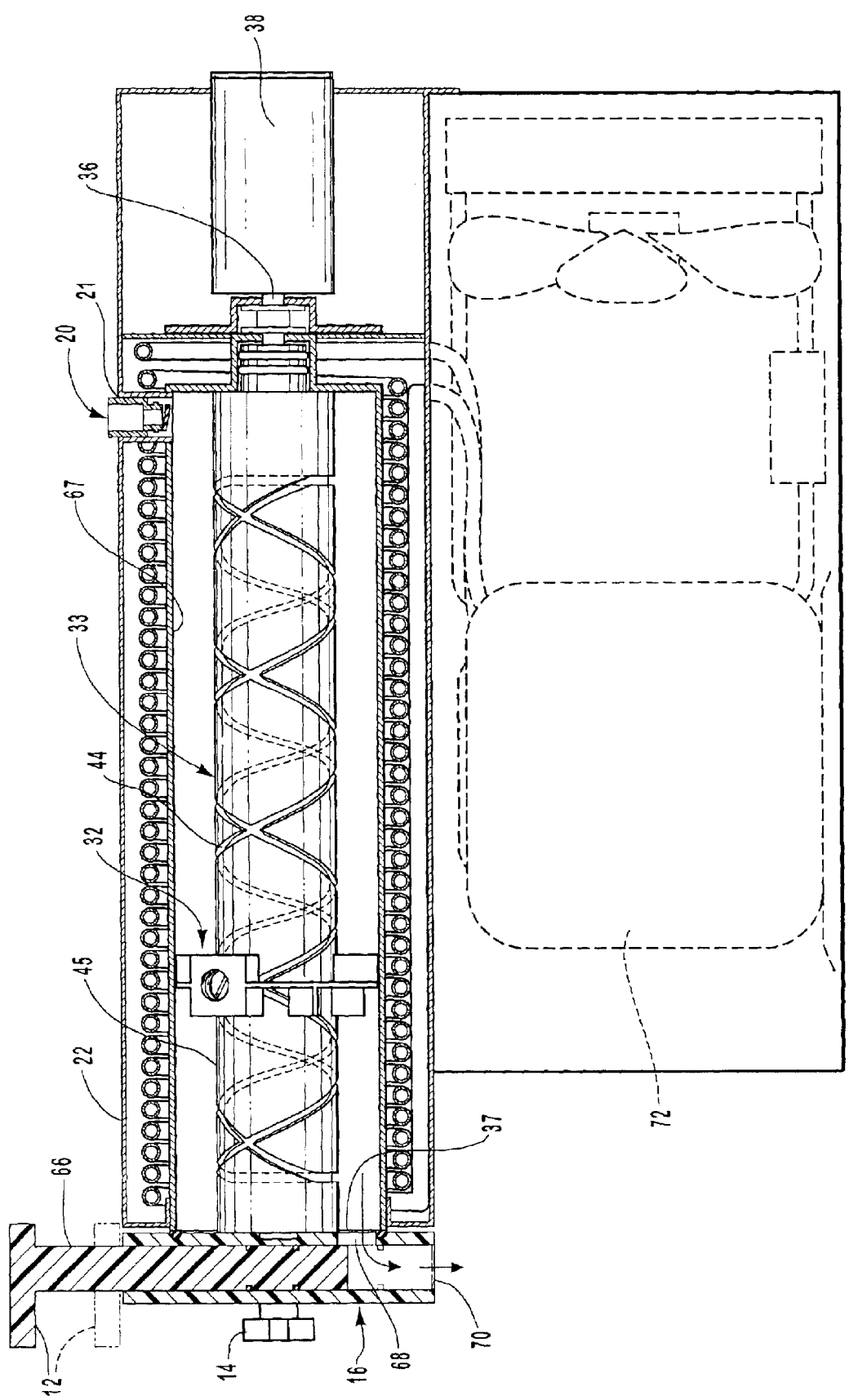
FIG. 8 is a side sectional view of the present invention showing the mixing spindle and paddle wheel inside the cooling canister.

Housing 24 houses suitable conventional refrigeration devices 72 (such as, for example, a compressor, condenser, and/or condenser fan motor), as shown generally in phantom lines in FIG. 8, which maintain the cooling canister 22 at a temperature cold enough to cause a frozen food product mixture to freeze to an appropriate degree. Refrigeration devices 72 may be coupled to the frozen food making device 10 in any suitable manner, such as by means of refrigeration coils as illustrated in FIG. 8, as will be readily understood by those skilled in the art. A front vent 18 in housing 24 provides a vent for the refrigeration devices 72. The front vent 18 can be of any suitable shape and can be located at any suitable place on the housing 24.

Importantly, canister 22 is provided with a flux capacitor valve 20. Flux capacitor 20 is a one-way valve and is positioned on top of canister 22 so as to communicate with the interior of canister 22 at a location farthest away from dispensing block 16 (see FIG. 8). Flux capacitor allows air into canister 22 in order to permit the food product to be dispensed through dispensing block 16, as will be described in further detail below. In addition, flux capacitor 20 provides an opening to canister 22 through which a frozen food product mixture may be poured into cannister 22.

On/off switch 28 turns on a driving device 38 (shown in FIG. 4) as well as the refrigeration devices 72. Indicator light 26 indicates when the switch 28 is in the "on" position. Alternatively, light 26 may be used to indicate that the contents of canister 22 are at a desired temperature and that the frozen food product is thus "done." In some embodiments, knob 30 is a temperature control that controls the operation of refrigeration devices 72 and provides for variation in the temperature of the cooling canister 22. Alternatively, knob 30 maybe attached to a timer to automatically turn off device 10 after a predetermined period of time. In describing switch 28, light 26, and knob 30, it will be readily understood that device 10 may have any of a wide variety of desired user controls. For example, device 10 may be equipped with a push button start switch instead of toggle switch 28.

Figure 2:
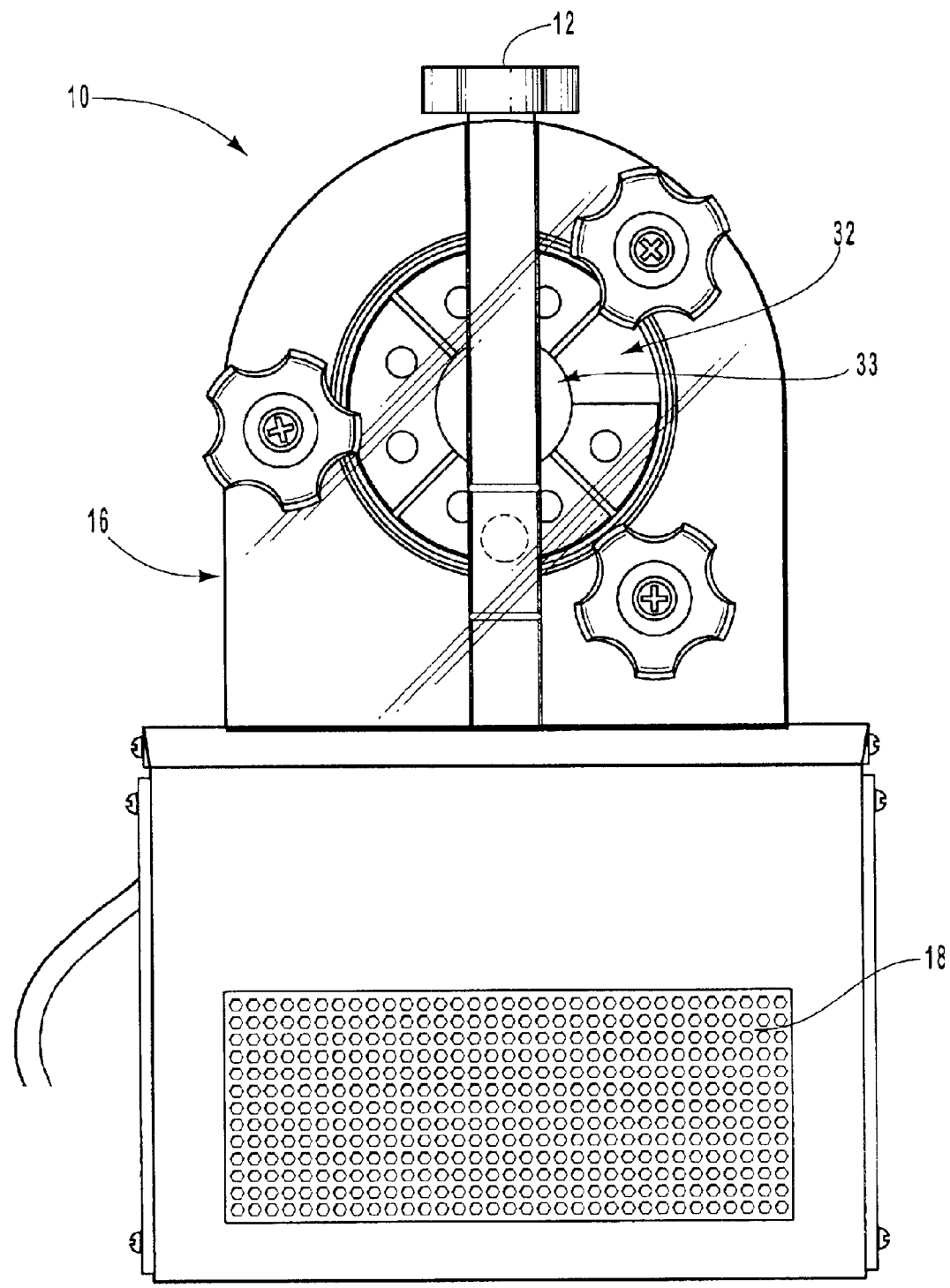
FIG. 2 is a front elevational view of the embodiment of the present invention shown in FIG. 1 wherein the paddle wheel can be seen through the transparent dispensing block.

FIG. 2 shows a front elevational view of the embodiment of the present invention shown in FIG. 1 wherein a paddle wheel 32 can be seen through the transparent dispensing block 16. A mixing spindle 33 can also be seen through the transparent dispensing block 16. Both the paddle wheel 32 and the mixing spindle 33 are described further in conjunction with the discussion accompanying FIGS. 5 through 8.

Figure 3:
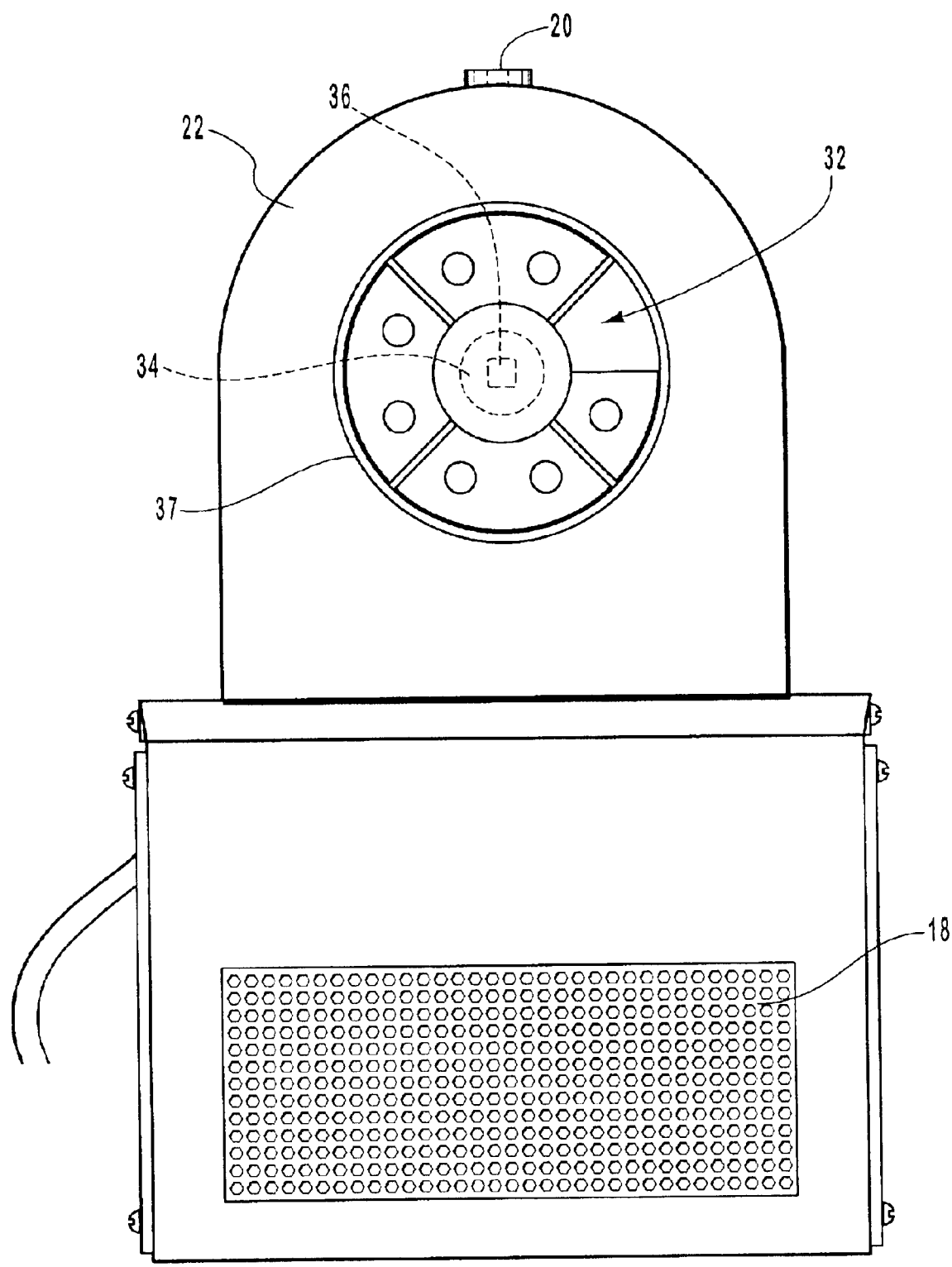
FIG. 3 is a front plan view showing one embodiment of the present invention in which both the mixing spindle and the dispensing block have been removed from the cooling canister.

FIG. 3 illustrates a front plan view showing one embodiment of the present invention in which both the mixing spindle 33 and the dispensing block 16 have been removed from the cooling canister 22. Here, it can be seen that the cooling canister 22 has a substantially circular mouth or front opening 37 to a substantially cylindrical inner food container 67 (shown in FIG. 8) that preferably has a smooth surface. The back of the container 67 has a recess 34 (again referring to FIG. 3) for receiving a spindle extension 46 (see FIG. 5). Recess 34 also contains a drive shaft 36 (seen best in FIG. 8) which fits into a hole in the mixing spindle 33 so that when the drive shaft 36 is spun around its lengthwise horizontal axis, the mixing spindle 33 also spins around the same horizontal axis.

Figure 4:
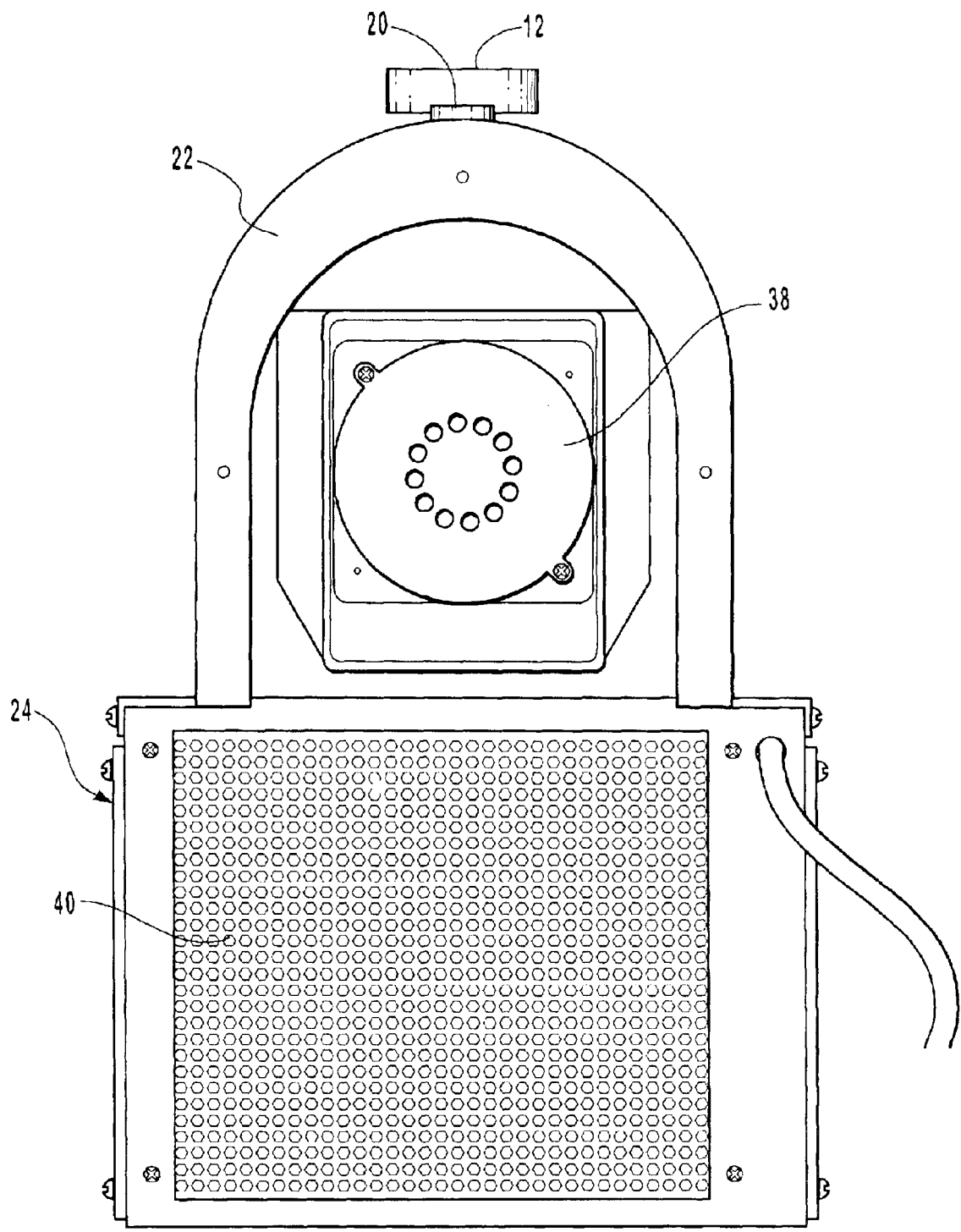
FIG. 4 is a back elevational view of the embodiment of the present invention shown in FIG. 1.

FIG. 4 shows a back elevational view of the embodiment of the present invention shown in FIG. 1. Driving device 38 is coupled to the cooling canister 22 for spinning the drive shaft 36 around the drive shaft's lengthwise horizontal axis. The driving device 38 is here shown as an electric motor. However, the driving device 38 can be any type of appropriate drive mechanism for spinning the drive shaft 36. Incidentally, a back vent 40 is shown on the back side of the housing 24. As was mentioned above in conjunction with the front vent 18, the back vent 40 is a vent for the refrigeration devices 72 and can be of any suitable shape as well as at any suitable location on the housing 24.

Figure 5:
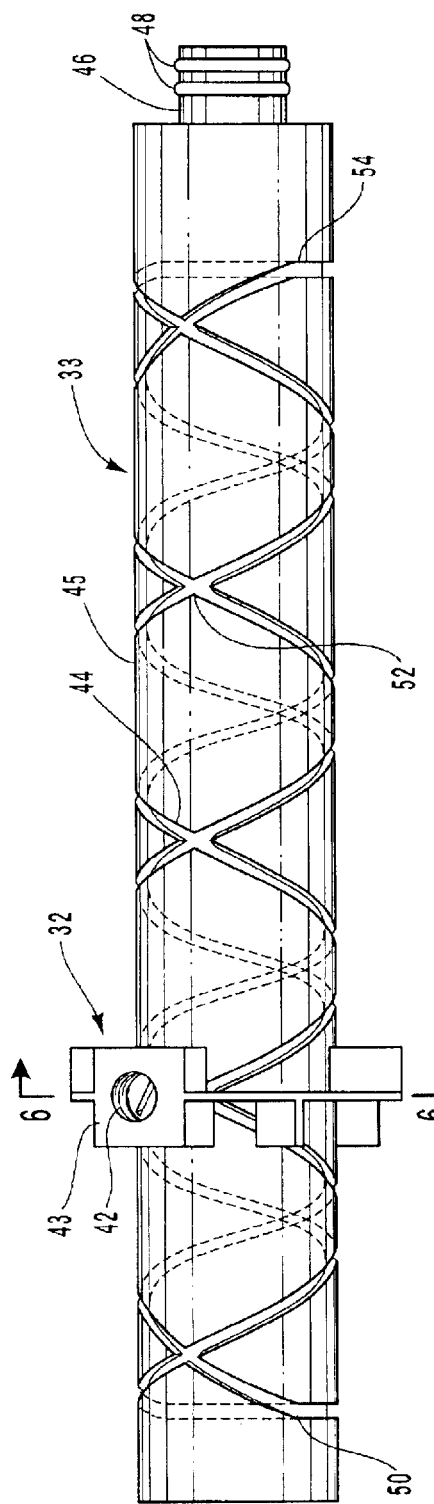
FIG. 5 is a side view of the mixing spindle and paddle wheel of one embodiment of the present invention.
Figure 7:
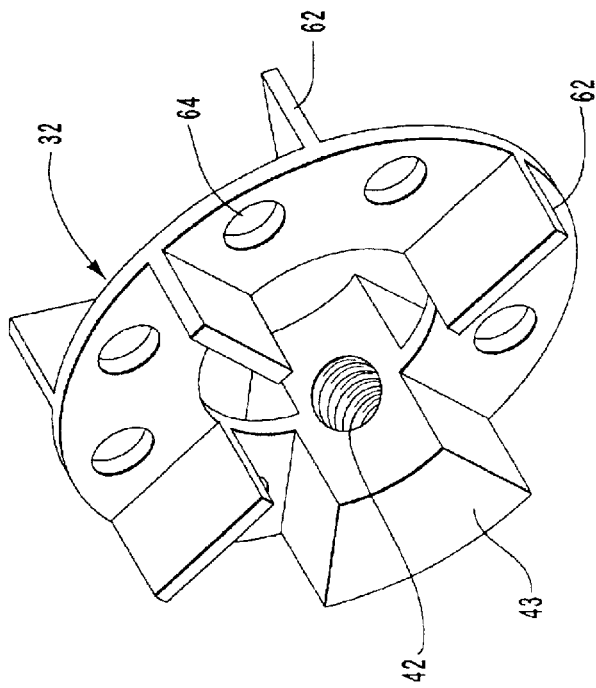
FIG. 7 is a perspective view of the paddle wheel of FIG. 5.

FIG. 5 is a side view of the mixing spindle 33 and paddle wheel 32 in one embodiment of the present invention. The mixing spindle 33 is elongate, has a substantially horizontal, lengthwise axis, and is rotatable about its lengthwise axis. In the preferred embodiments, mixing spindle 33 is made of a solid plastic material. Nevertheless, mixing spindle may also be made of metal or any other suitable material. Mixing spindle 33 has a continuous, crisscrossing, recessed track 44 all around its lengthwise outer surface 45. The crisscrossing track 44 is a closed-loop track and has front-end obtuse angles 50 and back-end obtuse angles 54 for changing the direction of the paddle wheel 32 (the details of the manner in which the direction is changed will be further discussed below). O-rings 48 on extension 46 help create a snug fit when mixing spindle 33 is coupled to drive shaft 36 within recess 34 (the latter two elements being shown in FIG. 3) of the canister 22.

Paddle wheel 32 encircles the mixing spindle 33. Paddle wheel 32 preferably has a rounded circumference that fits snugly against the inner food container 67 of the canister 22 (see FIG. 8) and yet can nevertheless slide along the container 67 of the canister 22. Paddle wheel 32 includes a block 43 and a plug hole 42 within the block 43, both of which can be seen in FIG. 6 (which shows a sectional view of the mixing spindle 33 and paddle wheel 32 as taken along lines 6—6 in FIG. 5) and in FIG. 7 (which shows a perspective view of the paddle wheel 32). Paddle wheel 32 also includes staggered paddles 62 and a series of holes 64. The holes 64 allow ice cream or other frozen food product ingredients to flow through the paddle wheel 32 when it moves along the length of the mixing spindle 33.

In one embodiment, paddle wheel 32 is made of a plastic material. Alternatively, paddle wheel 32 may be made of metal or any other suitable material.

Figure 6:
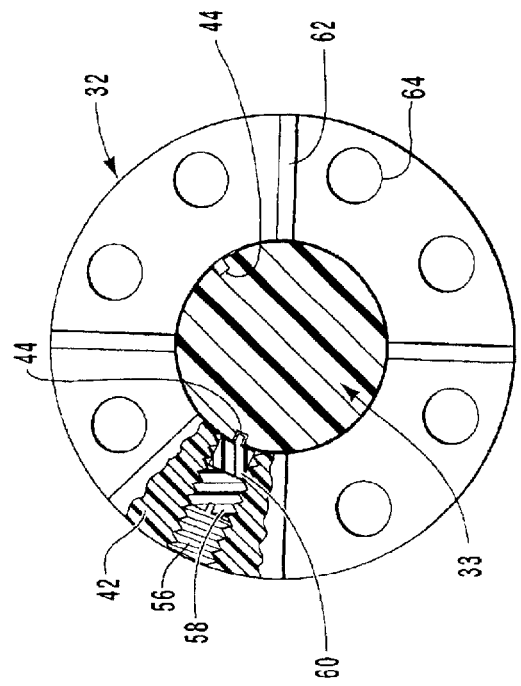
FIG. 6 is a sectional view of the mixing spindle and paddle wheel as taken along lines 6—6 in FIG. 5.

As shown in FIG. 6, a free-floating, rotatable plug or guide skate 60 sits within the plug hole 42. Guide skate 60 is a smooth cylindrical piece with a shelf-like protrusion which extends into the crisscrossing recessed track 44. Alternatively, guide skate 60 may be provided with guide pins or other suitable guiding structures. Guide skate 60 is freely rotatable within the plug hole 42 around its lengthwise axis. In other words, guide skate may freely rotate a full 360 degrees about such axis. In addition, in some embodiments, guide skate 60 is free-floating in that it is not fixed to anything within the plug hole 42. For example, as shown in FIG. 6, guide skate 60 may be held inside the plug hole 42 by an inner threaded cap 58 and an outer threaded cap 56. The caps 58 and 56 each have a recessed portion on their outer surfaces for receiving, for example, a flathead screwdriver. This allows the caps to be easy unscrewed and removed so that the guide skate 60 can be removed or replaced. It should be emphasized that the caps 58 and 56 can be one piece and need not be threaded. Caps 58 and 56 maybe replaced by any sort of cap suitable for preventing the guide skate 60 from falling out of the block 43.

Referring now to FIG. 8, shown is an embodiment of the frozen food product maker 10 as it is fully assembled. Here, the paddle wheel 32 hugs the mixing spindle 33 so that the plug or guide skate 60 extends into the recessed track 44 on the spindle 33. When the driving device or motor 38 is turned on, the motor spins its drive shaft 36, which, in turn, spins the mixing spindle 33 that is coupled to the drive shaft 36. As the spindle 33 spins around its lengthwise horizontal axis, the moving slant of the now-rotating recessed track 44 urges the guide skate 60 along the track 44, thereby pulling the paddle wheel 32 across the lengthwise outer surface 45 of the spindle 33. The guide skate 60 is shaped so that its lengthwise extension or other guide structure is parallel to the direction of its travel within the track 44. Thus, at crisscrossed junctions 52 (see FIG. 5), the guide skate 60 does not cross over into the portion of the track 44 that crisscrosses with the portion of the track 44 that the guide skate 60 is currently traveling within.

However, when the guide skate 60 comes to obtuse angle 50 at one end of the spindle 33, the guide skate 60 changes direction and causes the paddle wheel 32 to reverse and move towards the opposite end of the spindle 33. The guide skate 60 then moves along the portion of the track 44 that crisscrossed with the portion of the track 44 that it had just traveled along. When the guide skate 60 comes to the obtuse angle 54 at the other end of the spindle 33, the guide skate 60 causes the paddle wheel 32 to again reverse its direction of travel along the spindle 33. This back-and-forth movement of the paddle wheel 32 pushes the ice cream or other frozen food product back and forth inside the cooling canister 22 and continues as long as needed.

As the paddle wheel 32 moves back and forth along the length of the spindle 33, it should be noted that the guide skate 60, and, accordingly, the paddle wheel 32, additionally rotate around the circumference of the spindle 33 as the guide skate 60 is guided along the track 44. Advantageously, this combination of rotation and back-and-forth movement (which, in other words, could be described as a back-and-forth helical movement) of the paddle wheel 32 causes the paddle to simultaneously mix, whip, and scrape the frozen food product, and then, when desired, to push the food product the dispensing block 16 for dispensing. Also, it will be noted that even though the paddle wheel 32 reverses its direction of travel along the length of the spindle 33, the drive shaft 36 and spindle 33 do not change their direction of rotation.

Figure 9:
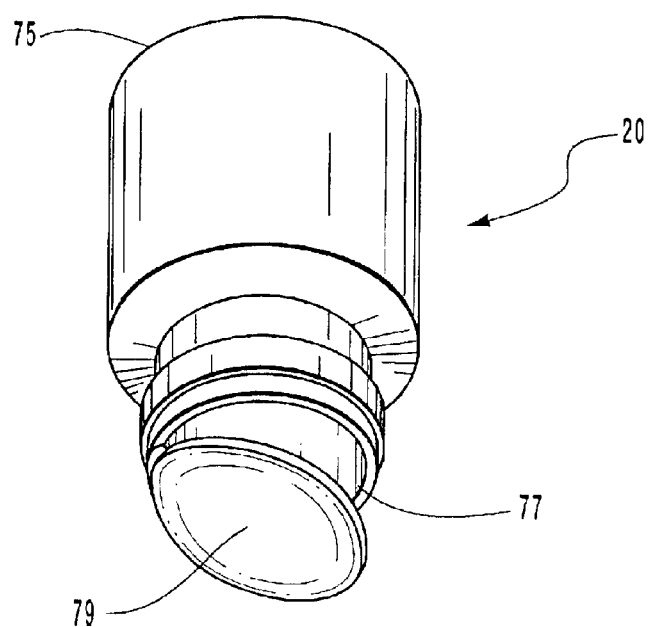
FIG. 9 is an exploded perspective view of a flux capacitor in accordance with one embodiment of the present invention.

In the preferred embodiments, flux capacitor 20 can be forced open (as shown in FIG. 9), or alternatively, flux capacitor 20 may be removed, so that ingredients can be poured into canister hole 21. During mixing, flux capacitor 20 prevents air or food product from escaping from canister 22 through the hole 21.

After the ice cream or other frozen food product is mixed, a person may pull up on the dispensing handle 12 to allow frozen food in the cooling canister 22 to exit through the front opening 37, into a hole 68 in the dispensing block 16, and out of bottom hole 70. During dispensing, air enters to canister 22 through flux capacitor 20. The person may then push down on the handle 12 (to the position shown in phantom lines), thereby pushing the product that is in the dispensing block 16 through the bottom hole 70 for final dispensing.

FIG. 9 shows an exploded perspective view of one embodiment of the flux capacitor or valve 20. Flux capacitor 20 may be any type of appropriate valve that serves to accommodate the flow of air as described above. However, this particular embodiment includes a substantially cylindrical body 75 defining an open passageway 77. A flat disc portion 79 is attached to one edge of the bottom end of flux capacitor 20, as shown. Disc 79 may be pushed away from the bottom end to allow food product to be poured through passageway 77. As will be appreciated, disc 79 also serves to seal passageway 77 to prevent air or the food product from escaping from canister 22 during mixing. Flux capacitor may be made of any suitable material. In some embodiments, for example, flux capacitor if formed of a resilient plastic or rubber material.

The position of flux capacitor 20 on canister 22 is also important. As mentioned previously, flux capacitor communicates with the interior housing 67 of canister 22 at a location that is opposite the open mouth 37 though which food product is dispensed. During dispensing, therefore, air enters canister 22 behind the food product and cooperates with the back and forth motion of the paddle wheel 32 to force the food product toward the mouth 37 of canister 22. This ensures that all of the food product within canister 22 can be dispensed through mouth 37 and the associated dispensing block 16.

Figure 10:
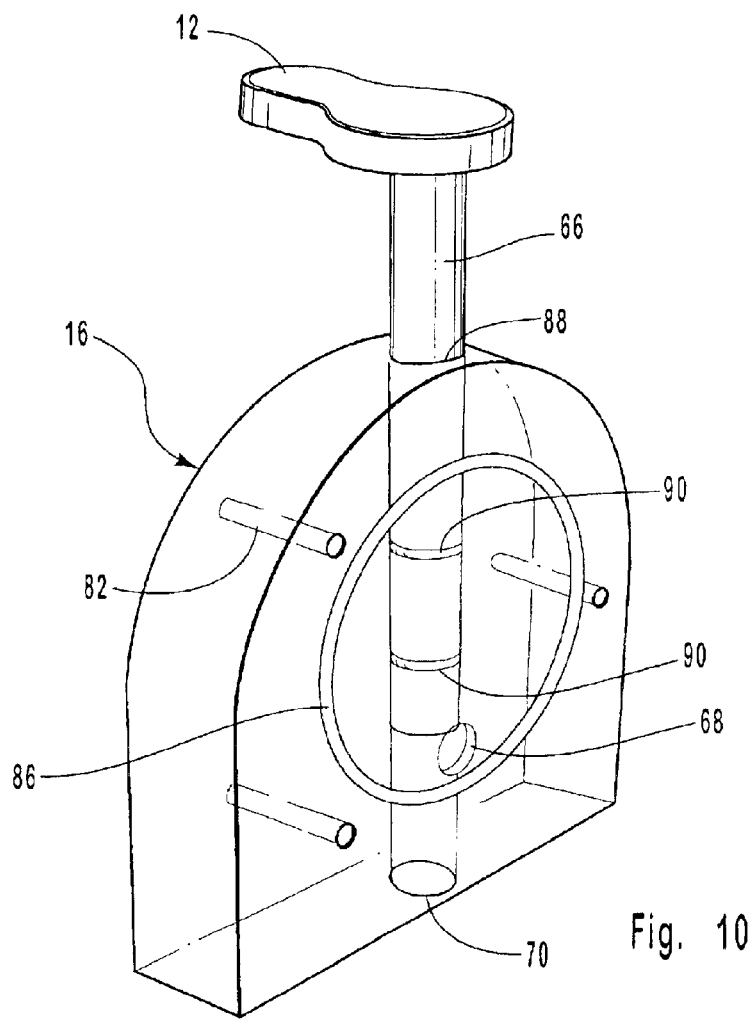
FIG. 10 is a back perspective view of the dispensing block of one embodiment of the present invention.

FIG. 10 shows a back perspective view of one embodiment of the dispensing block 16 when detached from the cooling canister 22. The function of the dispensing block 16 is to dispense the ice cream or other food product contained within the cooling canister 22. Any sort of appropriate dispensing block 16 may be used. However, in this particular embodiment, the dispensing block 16 is made of a transparent block of plastic that is removably attached to the cooling canister 22 to facilitate reaching inside of the canister 22 for repairs or for cleaning. Retaining knobs 14 (shown in FIG. 1) have threaded rods (not shown) that extend through retaining holes 82 and screw into threaded holes (not shown) on the front face of the canister 22. A large o-ring 86 seals the open mouth or front opening 37 (shown in FIG. 3) of the canister 22. A cylindrical hole 88 in the dispensing block 16 receives a dispensing shaft 66. Small o-rings 90 on the dispensing shaft 66 create a seal between the dispensing shaft 66 and the cylindrical hole 88. However, the seal is not so tight that the dispensing shaft 66 cannot slide within cylindrical hole 88. As was mentioned above in conjunction with the discussion of FIG. 8, the food product enters the dispensing block 16 through hole 68 and exits the block through hole 70.

Unlike other devices existing in the art, the present invention can mix either standard ice cream or slushes and other similar frozen foodstuffs. Hence, the present invention provides an extremely efficient frozen food making device which uses a unique mixing spindle and paddle combination that simultaneously mixes, scrapes, and pushes the frozen food product. The device can be readily configured as a counter-top unit for convenient domestic use. Of course, the device can also be made of a size and configuration suitable to commercial use.

It is underscored that the present invention may be embodied in other specific forms without departing from its spirit or essential characteristics. The described embodiments herein should be deemed only as illustrative. Indeed, the appended claims indicate the scope of the invention; the description, being used for illustrative purposes, does not limit the scope of the invention. All variations that come within the meaning and range of equivalency of the claims are to be embraced within their scope.

What is claimed is:

1. An apparatus for making a frozen food product comprising:
   a substantially horizontal, elongate spindle having a lengthwise axis, a circumference, and a continuous, closed-loop track along the outer surface of the spindle;
   a canister enclosing said spindle, said canister being adapted to hold said frozen food product;
   a driving device, coupled to said spindle, for spinning said spindle around said lengthwise axis; and
   a paddle wheel for mixing said frozen food product, said paddle wheel having a guide skate that extends into said track on said spindle and thereby guides the paddle wheel in a direction along the length of said spindle to mix the frozen food product when said driving device spins the spindle around said axis.

2. The apparatus of claim 1 wherein said paddle wheel also travels around the circumference of said spindle.

3. The apparatus of claim 1 wherein said paddle wheel surrounds said spindle.

4. The apparatus of claim 1 wherein said paddle wheel further comprises a plurality of staggered, outwardly extending paddles.

5. The apparatus of claim 1 wherein said paddle wheel further comprises a plurality of holes through which the frozen food product can flow.

6. The apparatus of claim 1 wherein said guide skate is free floating and wherein said paddle wheel further comprises a plug block for holding said guide skate.

7. The apparatus of claim 1 wherein said canister has an inner container and said paddle wheel has a circumference that fits snugly within said inner container.

8. The apparatus of claim 1 wherein said guide skate travels around the circumference of said spindle.

9. The apparatus of claim 1 wherein said paddle wheel reverses its direction of travel while said spindle continues to spin around said lengthwise axis in a single direction.

10. The apparatus of claim 1 wherein said canister further comprises a flux capacitor valve for permitting air to enter the canister during dispensing of the frozen food product.

11. The apparatus of claim 1 further comprising a refrigeration unit coupled to said canister.

12. The apparatus of claim 1 further comprising a removable dispensing block coupled to said canister.

13. A device for mixing and freezing a food mixture comprising:
   a substantially horizontal, elongate spindle having a lengthwise axis, a circumference, and a continuous, closed-loop, crisscrossed, recessed track along the outer surface of the spindle;
   a canister enclosing said spindle, said canister having a cylindrical, substantially horizontal inner core for holding a frozen food mixture;
   a refrigeration unit, coupled to said inner core, for maintaining said inner core at a temperature cold enough to cause said frozen food mixture to freeze;
   a driving device, coupled to said spindle, for spinning said spindle around said lengthwise axis; and
   a paddle wheel surrounding the circumference of said spindle, for mixing said frozen food mixture, said paddle wheel having a circumference that fits snugly against said inner core but that nevertheless can slide along said inner core, said paddle wheel also having a free-floating guide skate that extends into said track on said spindle and thereby guides the paddle wheel back and forth along the length of said spindle to mix the frozen food when said driving device spins the spindle around said axis.

14. The device of claim 13 wherein said paddle wheel also travels around the circumference of said spindle.

15. The device of claim 13 wherein said paddle wheel further comprises a plurality of staggered, outwardly extending paddles.

16. The device of claim 13 wherein said paddle wheel further comprises a plurality of holes through which frozen food ingredients can flow.

17. The device of claim 13 wherein said paddle wheel further comprises a plug block for holding said guide skate.

18. The device of claim 13 wherein said guide skate travels around the circumference of said spindle.

19. The device of claim 13 wherein said paddle wheel reverses its direction of travel while said spindle continues to spin around said lengthwise axis in a single direction.

20. The device of claim 13 further comprising a refrigeration unit coupled to said canister.

21. A method for mixing and freezing food ingredients comprising:
   mixing food ingredients within a canister by means of a horizontal, elongate spindle and a paddle wheel, said spindle and said paddle wheel being contained within said canister, said paddle wheel traveling back and forth along a closed-loop track in said spindle via a freely rotatable guide skate; and freezing said food ingredients to a desired degree by cooling the canister holding said food ingredients.

22. The method of claim 21 wherein said track is criss-crossed.

23. The method of claim 21 wherein said food ingredients comprises ingredients for making ice cream.

24. The method of claim 21 further comprising spinning said spindle so that said paddle wheel travels around a circumference of said spindle.

25. The method of claim 21 wherein said paddle wheel further comprises a plurality of staggered, outwardly extending paddles.

26. The method of claim 21 wherein said paddle wheel further comprises a plurality of holes through which said food ingredients flow.

27. The method of claim 21 further comprising spinning said spindle so that said guide skate travels helically around the circumference of said spindle.

28. The method of claim 21 wherein said paddle wheel reverses its direction of travel while said spindle continues to spin in a single direction.

29. A high-speed frozen food making device comprising:
 a substantially horizontal, elongate spindle having a lengthwise axis and a continuous, closed-loop, criss-crossed track along the outer surface of the spindle;
 a substantially cylindrical, substantially horizontal canister that encloses said spindle, said canister having a cylindrical, substantially horizontal, inner container for holding food ingredients, said canister having a front end, a back end, and a top portion, said canister also having a hole in said top portion so that said food ingredients can be poured through said hole into said inner container;
 a refrigeration unit, coupled to said inner container, for maintaining said container at a temperature cold enough to cause said food ingredients to freeze;
 an electric motor, coupled to one end of said spindle, for spinning said spindle around said lengthwise axis;
 a paddle wheel surrounding said spindle and having outwardly-extending paddles for mixing said food ingredients, said paddle wheel having a plurality of holes for allowing said food ingredients to flow through said paddle wheel when said paddle wheel moves along the length of said spindle, said paddle wheel also having a circumference that fits snugly against said inner container of the canister but that nevertheless can slide along said inner container, said paddle wheel also having a free-floating guide skate that extends into said track on said spindle and thereby guides the paddle wheel helically around the spindle and back and forth along the length of said spindle to mix the food ingredients when said driving device spins the spindle around said axis; and
 a dispensing block, removably coupled to said front end of said canister, for dispensing said food ingredients when said food ingredients have frozen to an appropriate desired degree.

30. The high-speed frozen food making device of claim 29 further comprising a flux capacitor communicating with the inner container of the cannister, the flux capacitor permitting air to enter the container when the food ingredients are dispensed through said dispensing block.

31. The high-speed frozen food making device of claim 29 wherein the dispensing block comprises:
 a block attachment member removably attached to said front end of said canister, the block attachment member having a channel therein for receiving a dispensing shaft and a dispensing hole communicating between said channel and the inner container of the canister; and
 a dispensing shaft slidably inserted into the channel of the block attachment member for selectively blocking and unblocking said dispensing hole, thereby permitting said food ingredients to selectively enter the block attachment member through said dispensing hole and be dispensed through said channel.

* * * * *